(12) United States Patent
Chen

(10) Patent No.: US 10,293,442 B2
(45) Date of Patent: May 21, 2019

(54) C-TYPE CNC MACHINE CENTER

(71) Applicant: Feng-Tien Chen, Taichung (TW)

(72) Inventor: Feng-Tien Chen, Taichung (TW)

(73) Assignee: BAIZHENG INNOVATION TECHNOLOGY CO., LTD., Taichung (TW)

( * ) Notice: Subject to any disclaimer, the term of this patent is extended or adjusted under 35 U.S.C. 154(b) by 25 days.

(21) Appl. No.: 15/643,496

(22) Filed: Jul. 7, 2017

(65) Prior Publication Data
US 2019/0009376 A1   Jan. 10, 2019

(51) Int. Cl.
*B23Q 1/01* (2006.01)
*B23C 1/06* (2006.01)
*B23Q 1/46* (2006.01)

(52) U.S. Cl.
CPC .............. *B23Q 1/017* (2013.01); *B23C 1/06* (2013.01); *B23Q 1/46* (2013.01)

(58) Field of Classification Search
CPC .......... B23Q 1/01; B23Q 1/012; B23Q 1/015; B23Q 1/017; B23Q 1/621; B23Q 1/07; Y10T 409/307056; Y10T 409/309576
See application file for complete search history.

(56) References Cited

U.S. PATENT DOCUMENTS

| | | | | |
|---|---|---|---|---|
| 4,118,844 A | * | 10/1978 | Matsuzaki | B23B 31/263 29/26 A |
| 4,561,814 A | * | 12/1985 | Dahlgren, Jr. | B23Q 1/0009 408/130 |
| 5,468,101 A | * | 11/1995 | Shoda | B23Q 1/012 108/143 |
| 6,740,839 B1 | * | 5/2004 | Kung | B23H 1/00 219/69.11 |
| 2002/0176757 A1 | * | 11/2002 | Saito | B23Q 1/017 409/135 |
| 2004/0223824 A1 | * | 11/2004 | Kuo | B23Q 1/601 409/235 |
| 2006/0153655 A1 | * | 7/2006 | Chang | B23C 1/06 409/235 |
| 2008/0254959 A1 | * | 10/2008 | Takayama | B23Q 1/5412 483/32 |

(Continued)

FOREIGN PATENT DOCUMENTS

| | | | | |
|---|---|---|---|---|
| JP | 2001009620 A | * | 1/2001 | ............ B23Q 1/601 |
| JP | 2001219325 A | * | 8/2001 | |
| JP | 2005324261 A | * | 11/2005 | |

*Primary Examiner* — Nicole N Ramos
(74) *Attorney, Agent, or Firm* — Leong C. Lei

(57) ABSTRACT

A C-type CNC machine center generally includes a chassis, a displaceable table, a work table, a working spindle, a coupling seat, and a driver device. The chassis has a working area, a power area, and a displacement channel communicating with the working area and the power area. The displaceable table is slidably mounted to the chassis and located in the working area. The coupling seat is slidably coupled to the base seat in the power area and includes an elongate hollow body and is fixedly mounted, with an end thereof, to the displaceable table. The driver device includes a motor mounted to the base seat in the power area and a ball screw coupled to the motor and the coupling seat to drive the coupling seat and the displaceable table to synchronously conduct reciprocal movement in a given direction. The coupling seat separates the ball screw from the working area.

4 Claims, 10 Drawing Sheets

(56) References Cited

U.S. PATENT DOCUMENTS

2009/0067941 A1\* 3/2009 Chen .................. B23Q 1/621
  408/129
2016/0193669 A1\* 7/2016 Chen .................. B23Q 39/023
  409/203

\* cited by examiner

C-TYPE CNC MACHINE CENTER

TECHNICAL FIELD OF THE INVENTION

The present invention relates generally to a metalworking machine, and more particularly to a C-type CNC (Computer Numeric Control) machine center that helps maintain movement smoothness and reduces overcall cost.

DESCRIPTION OF THE PRIOR ART

A prior art C-type computer numeric control (CNC) machine center 1, as shown in FIG. 1, generally comprises a chassis 2, a displaceable table 3 disposed on the chassis 2, a work table 4 disposed on the displaceable table 3, a working spindle 5 mounted to the chassis 2, and a driver device 6 mounted to the chassis 2 and coupled to the displaceable table 3. The work table 4 receives and securely holds a work piece thereon. The work table 4 is driven by a drive source provided on the displaceable table 3 to do reciprocal movement in an X-axis direction. The driver device 6 is operable to drive the displaceable table 3 for reciprocal movement in a Y-axis direction. The working spindle 5 securely holds a tool thereon and is reciprocally movable in a Z-axis direction along the chassis 2.

To accurately drive the displaceable table 3 to do reciprocal movement in the Y-axis direction, the driver device 6 is made up of a motor 7 and a ball screw 8. The ball screw 8 is coupled between the motor 7 and the displaceable table 3 to convert rotation power of the motor 7 into power that drives linear displacement of the displaceable table 3. However, since the ball screw 8 is a part of high precision, a dust protection cover 9 must be provided over the ball screw 8. The dust protection cover 9 must be stretchable or extended with the movement of the displaceable table 3 so that minor gaps are still present through which foreign objects or debris generated during a machining operation may get stuck to the ball screw 8, wherein movement may be made unsmooth for non-severe situation and machining accuracy may deteriorate and parts get damage in a severe situation, making the service life shortened.

SUMMARY OF THE INVENTION

In view of the above problems, in order to improve the prior art structure that may get unsmooth movement due to foreign objects stuck to the ball screw and suffering poor machining accuracy and damage of parts to eventually shorten the service life thereof, the present invention provides a C-type CNC machine center, which generally comprises: a chassis, which comprises a base seat and a vertical seat, the vertical seat being connected, in a manner of being upright erected, to a top surface of the base seat, the top surface of the base seat and a front surface of the vertical seat defining and delimiting therebetween a working area, the base seat being extended to a rear side of the vertical seat and defining a power area, the base seat being provided thereon, in the working area, with two slide rails that are spaced from each other by a distance and substantially parallel to each other, the base seat being provided thereon, in the power area, with a third slide rail, the third slide rail being extended from the power area to reach into a portion of the working area, the vertical seat being formed with a displacement channel in the connection thereof with the base seat and extending therethrough, the displacement channel communicating with the working area and the power area; a displaceable table, which comprises a base platform slidably coupled to the two slide rails provided on the base seat of the chassis in the working area; a work table, which receives and securely holds at least one work piece thereon and is slidably mounted to the displaceable table, the work table being reciprocally movable in a first axial direction; a working spindle, which is coupled to the vertical seat of the chassis to hold and securely fix at least one tool thereof and is reciprocally movable in a second axial direction; a coupling seat, which comprises an elongate hollow body, one end of the coupling seat being fixedly connected to or integrally formed with the base platform of the displaceable table, slidably coupled to the third slide rail provided on the base seat in the power area; and a driver device, which comprises a motor and a ball screw, the motor being mounted to the base seat in the power area, the ball screw being coupled to the motor and the coupling seat, wherein the ball screw converts rotation power supplied from the motor into power for linear displacement to drive the coupling seat and the displaceable table to synchronously conduct reciprocal movement in a third axial direction. As such, the present invention provides an arrangement of the coupling seat to separate the ball screw from the working area or to cover the ball screw with the coupling seat for separation from the working area to prevent foreign objects attached and stuck to the ball screw so as to maintain smoothness of the ball screw and reduce damage thereby achieving effects of improving accuracy and extending service life. Further, the displaceable table is coupled to the coupling seat so that stiffness thereof and precision of span and vertical angle of the slide rails are all improved to thereby improve displacement stability and machining accuracy. Further, the coupling seat is structured as an elongate hollow body so as to reduce the size and weight thereof and the power of the motor and the specification of the ball screw that are involved in driving reciprocal movement of the coupling seat and the displaceable table can be reduced. As such, the purpose of lowering down cost can be achieved.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

Figure 1:
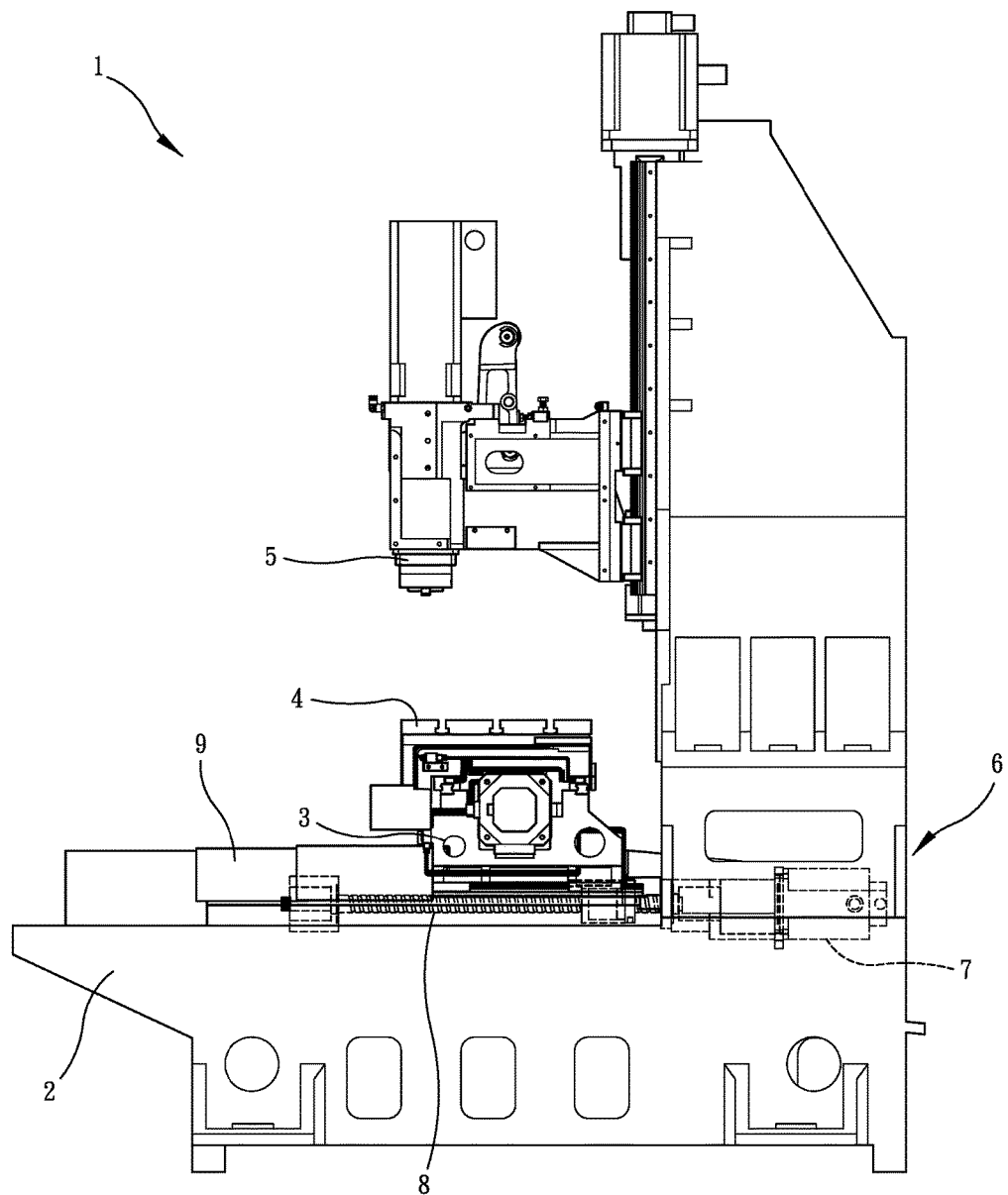
FIG. 1 is a schematic view showing a conventional metalworking machine.
Figure 2:
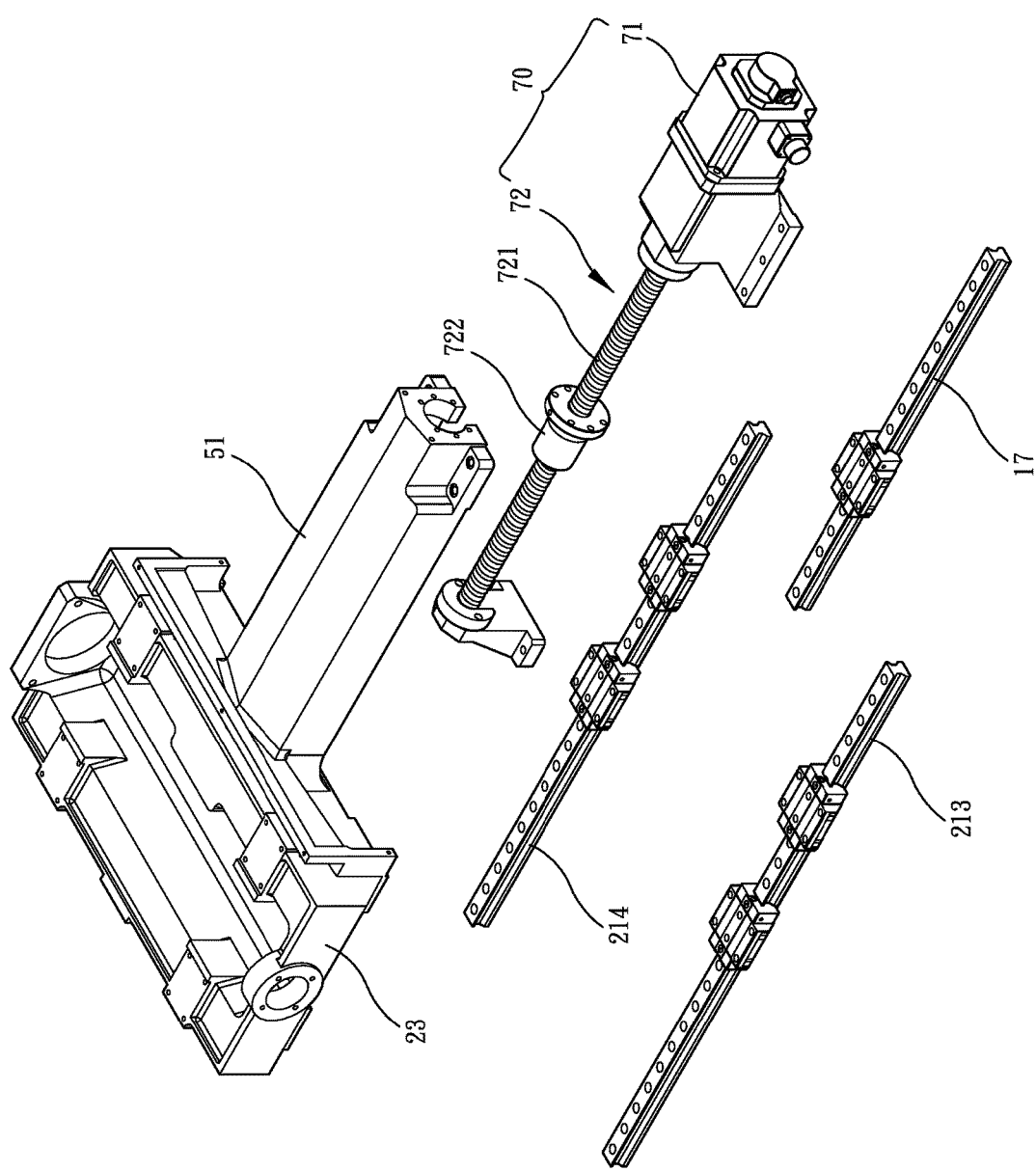
FIG. 2 is a perspective view showing parts of a third axle of the present invention.
Figure 3:
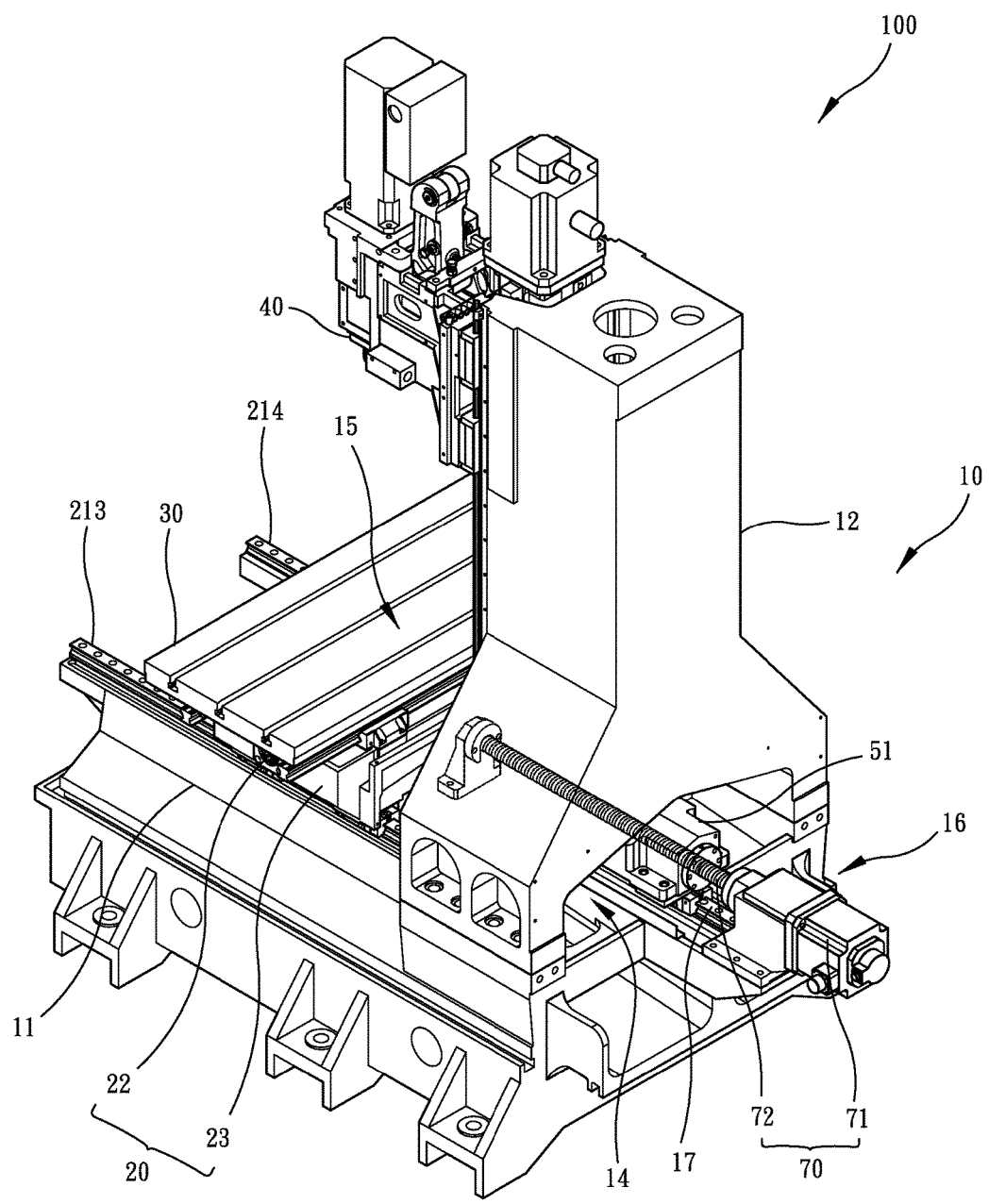
FIG. 3 is a perspective view showing the present invention in an assembled form.

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 2-5, a C-type CNC machine center, generally designated at 100, according to a first embodiment of the present invention is shown, generally comprising a chassis 10, a displaceable table 20, a work table 30, a working spindle 40, a coupling seat 51, and a driver device 70.

The chassis 10 comprises a base seat 11 and a vertical seat 12. The vertical seat 12 is connected, in a vertically erected manner, to a top surface of the base seat 11. The top surface of the base seat 11 and a front surface of the vertical seat 12 define and delimit therebetween a working area 15. The base seat 11 extends to a rear side of the vertical seat 12, where a power area 16 is formed. Two slide rails 213, 214, which are spaced from each other by a predetermined distance and are substantially parallel with each other, are provided on the base seat 11 in the working area 15. A third slide rail 17 is provided on the base seat 11 in the power area 16 such that the third slide rail 17 extends from the power area 16 to reach into a portion of the working area 15. The vertical seat 12 is formed with a displacement channel 14, which extends through front and rear sides of the vertical seat 12, at the connection thereof with the base seat 11.

The displaceable table 20 comprises a base platform 23 and a drive source 22. The base platform 23 is slidably mounted to the two slide rails 213, 214 of the base seat 11 in the working area 15. The drive source 22 is mounted on the base platform 23.

The work table 30 is provided for clamping and holding a work piece (not shown in the drawings) thereon and is slidably mounted to the base platform 21 of the displaceable table 20 and is coupled to the drive source 22 to allow the drive source 22 to drive the work table 30 for reciprocal movement in a first axial direction.

The working spindle 40 is vertically arranged and coupled to the vertical seat 12 of the chassis 10 to securely hold at least one tool (not shown in the drawings) for reciprocal movement in a second axial direction.

The coupling seat 51 is made in the form of an elongate hollow body. The coupling seat 51 is fixedly connected or integrally formed, at one end thereof, with the base platform 23 of the displaceable table 20 and is slidably mounted to the third slide rail 17 of the base seat 11 in the power area 16 and extends through the displacement channel 14 for reciprocal movement in and between the power area 16 and a portion of the working area 15. The base platform 23 and the portion of the coupling seat 51 between front and rear ends thereof collectively form an extended span in a direction of a third axis so as to provide enhanced stability in the reciprocal movement thereof.

The driver device 70 comprises a motor 71 and a ball screw 72. The motor 71 is fixedly mounted to the base seat 11 in the power area 16. The ball screw 72 is coupled to the motor 71 and the coupling seat 51. The ball screw 72 comprises a screw rod 721 and a nut 722 that contains therein rolling balls. The nut 722 is mounted to the coupling seat 51. The screw rod 721 is coupled to the motor 71 and in threading engagement with the nut 722 so that the ball screw 72 converts rotation power supplied from the motor 71 into linear movement power to drive the coupling seat 51 and the displaceable table 20 to synchronously conduct reciprocal movement in the third axial direction. The ball screw 72 is housed and covered by the coupling seat 51.

Figure 4:
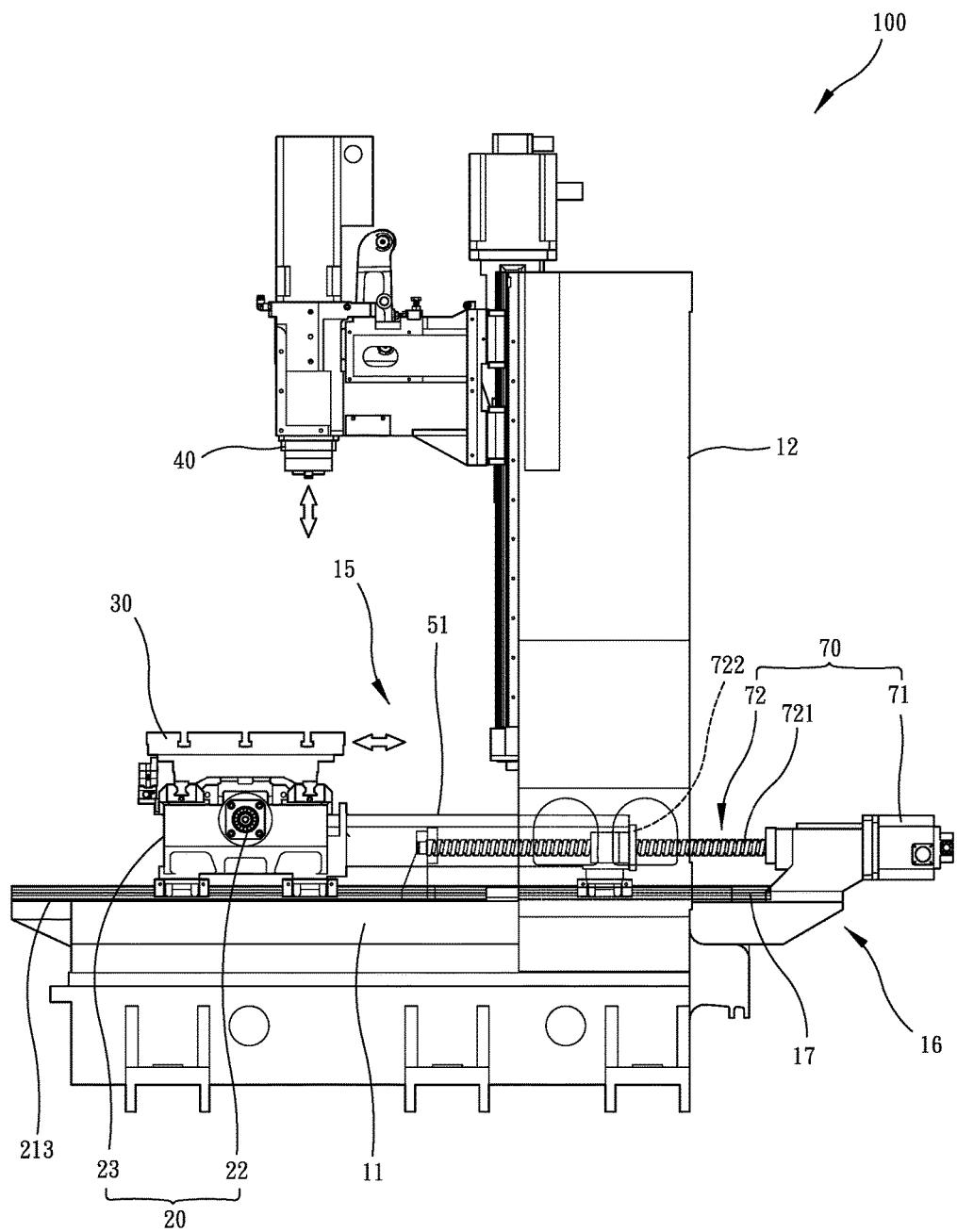
FIGS. 4 and 5 are schematic views illustrating reciprocal movement of the third axle of the present invention.
Figure 5:
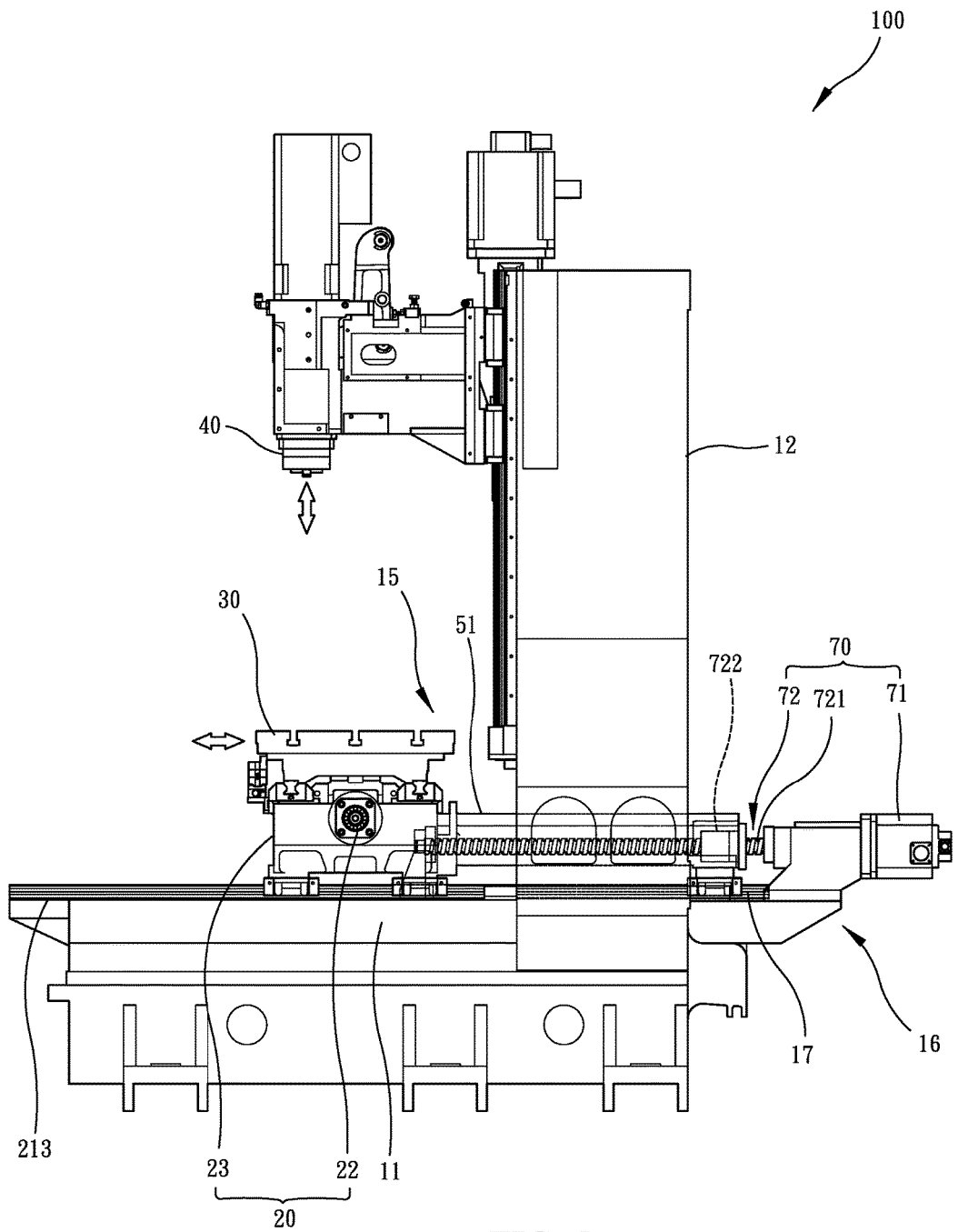

The above provides a description to components of the C-type CNC machine center 100 according to the first preferred embodiment of the present invention and the assembling thereof, and features of the embodiment in operation will be described below:

Since in the present invention, the coupling seat 51 is coupled between the displaceable table 20 and the driver device 70, when the driver device 70 drives the coupling seat 51 and the displaceable table 20 to synchronously conduct reciprocal movement in the third axial direction (as shown in FIGS. 4 and 5), the coupling seat 51 is located in the working area 15 and the ball screw 72 of the driver device 70 is located outside the working area 15 (namely located in the power area 16), so that the ball screw 72 is protected from foreign objects generated in the working area 15 getting attached thereto so as to maintain smoothness of transmission and to reduce potential risk of damage of components and parts thereby achieving effects of improving accuracy and extending service life. Further, the base platform 23 of the displaceable table 20 is coupled to the coupling seat 51 so that stiffness thereof and precision of span and vertical angle of the slide rails are all improved to thereby improve displacement stability and machining accuracy. Further, the coupling seat 51 is an elongate hollow body, so that the size and weight thereof are reduced and the power of the motor 71 and the specification of the ball screw 72 that are involved in driving reciprocal movement of the coupling seat 51 and the coupling seat 51 can be reduced. As such, the purpose of lowering down cost can be achieved.

Figure 6:
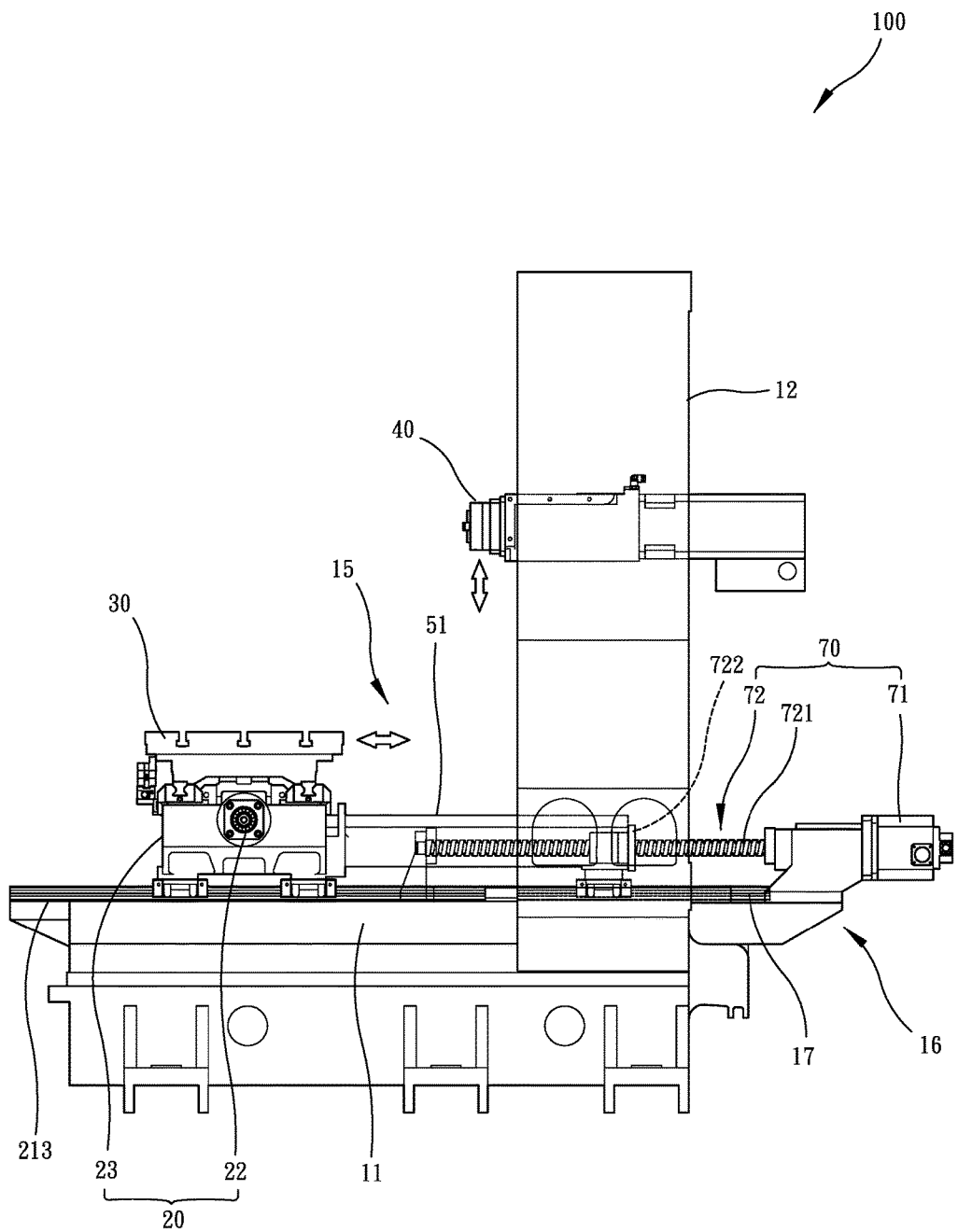
FIG. 6 shows an embodiment in which a working spindle of the present invention is set in a horizontal form.
Figure 7:
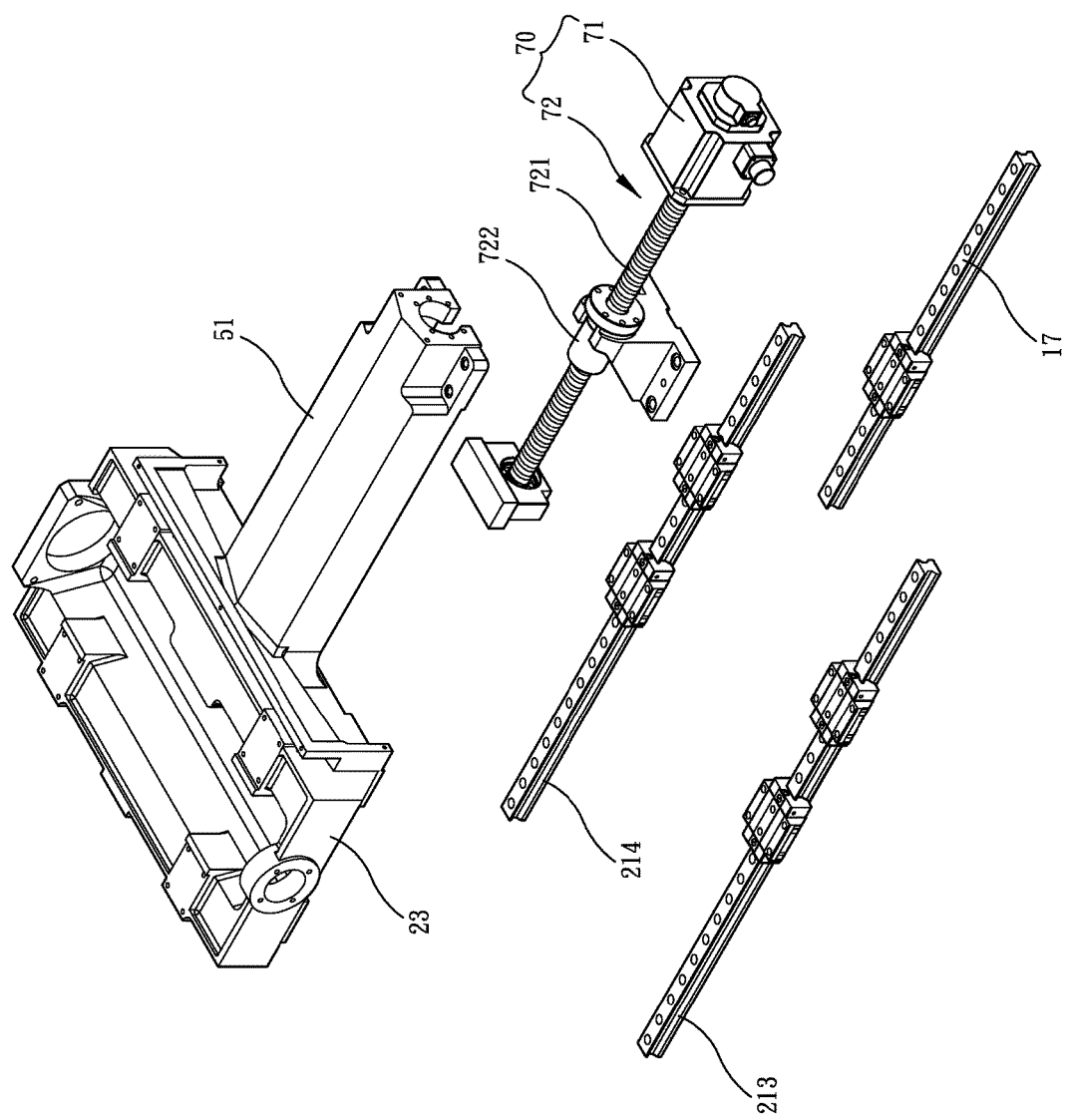
FIG. 7 is a perspective view showing parts of a third axle of a second embodiment of the present invention.
Figure 8:
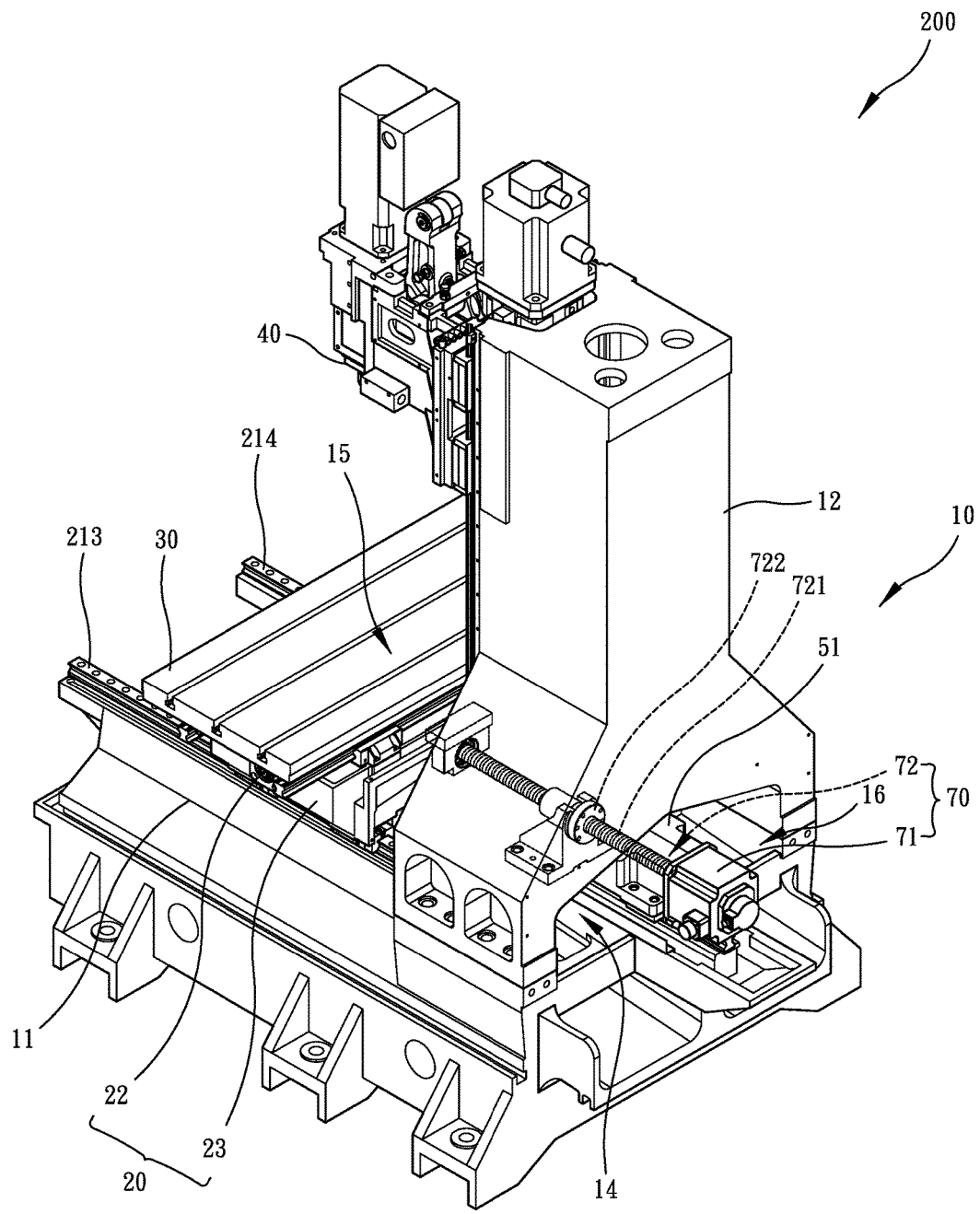
FIG. 8 is a perspective view showing the second embodiment of the present invention in an assembled form.
Figure 9:
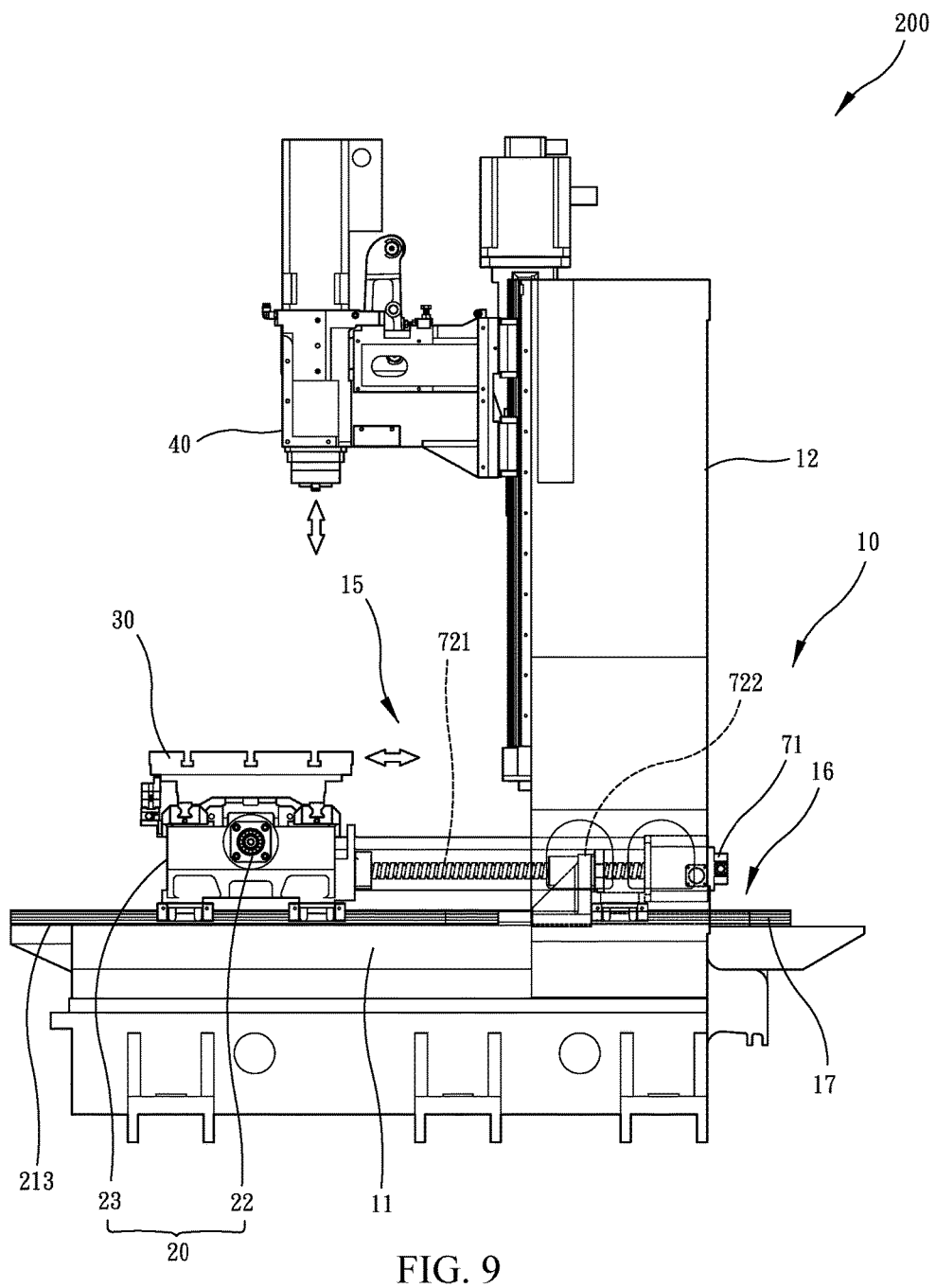
FIGS. 9 and 10 are schematic views illustrating reciprocal movement of the third axle of the second embodiment of the present invention.
Figure 10:
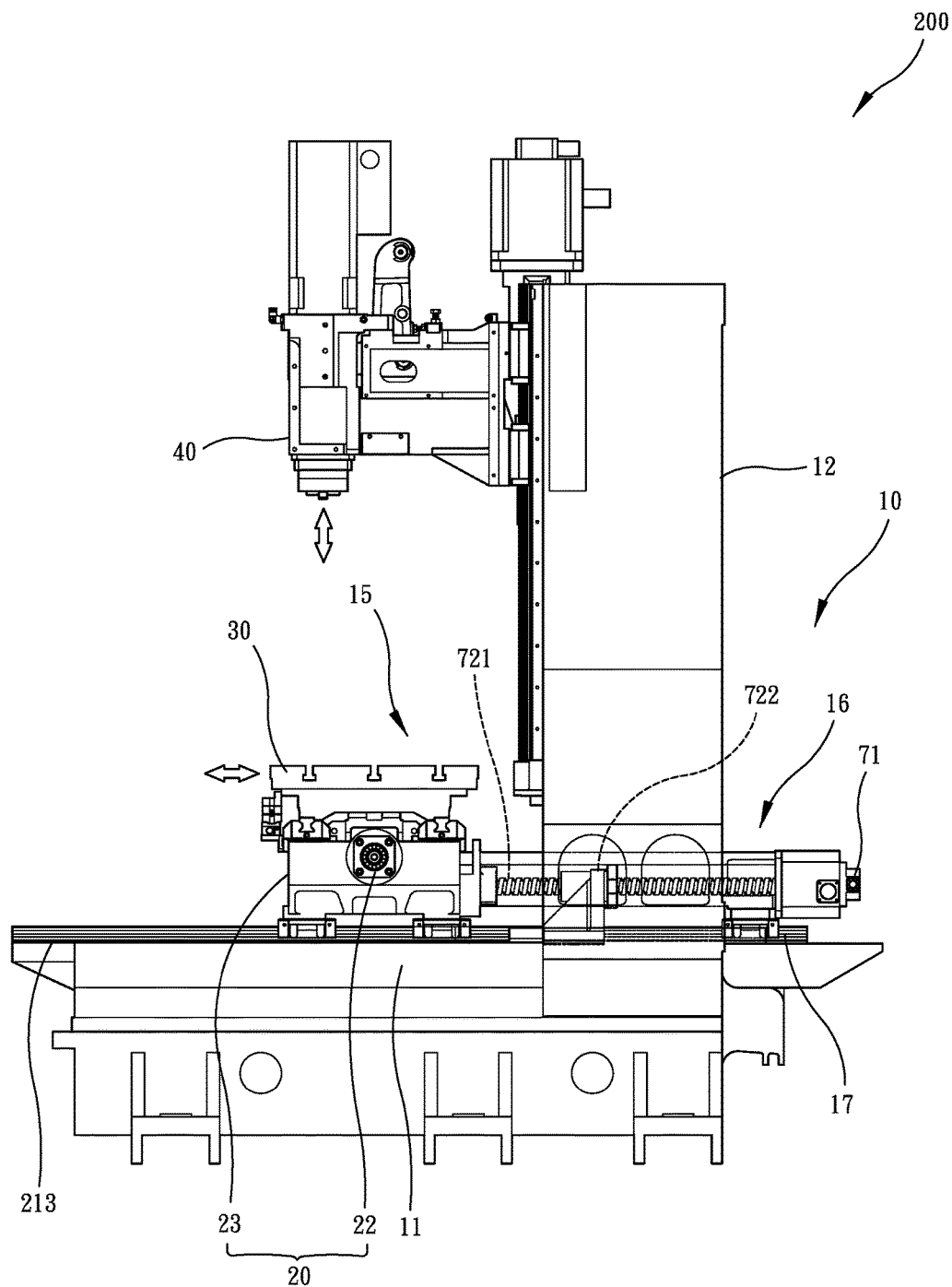

Alternatively, as shown in FIG. 6, the working spindle 40 can be arranged horizontal and coupled to the vertical seat 12 of the chassis 10.

Referring to FIGS. 7-10, a C-type CNC machine center, generally designated at 200, according to a second preferred embodiment of the present invention is shown and, similar to the first embodiment, comprises a chassis 10, a displaceable table 20, a work table 30, a working spindle 40, a coupling seat 51, and a driver device 70. A difference between the two is as follow:

In the instant embodiment, the driver device 70 similarly comprises a motor 71 and a ball screw 72; however, the motor 71 is fixedly mounted to the coupling seat 51 and is displaceable with the coupling seat 51. The nut 722 of the ball screw 72 is mounted to the base seat 11 of the chassis 10 and the screw rod 721 of the ball screw 70 is coupled to the motor 71 and in threading engagement with the nut 722. The ball screw 72 is housed in the coupling seat 51 and thus separated from the working area 15, so that foreign objects or debris may not get attached to the ball screw 72.

Although, in the instant embodiment, the components to which the motor 71 and the ball screw 72 are mounted and the positions thereof are different from those of the previous embodiment, the same effectiveness can be achieved.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A C-type computer numeric control (CNC) machine center, comprising:
    a chassis, which comprises a base seat and a vertical seat, the vertical seat being arranged vertical and connected to a top surface of the base seat, the top surface of the base seat and a front surface of the vertical seat defining and delimiting therebetween a working area, the base seat extending into a rear side of the vertical seat to define a power area, wherein the base seat is provided thereon, in the working area, with two slide rails that are spaced from each other by a distance and are substantially parallel to each other and the base seat is provided thereon, in the power area, with a third slide rail, the third slide rail being extended from the power area to reach into a portion of the working area, the vertical seat being formed with, at the connection thereof with the base seat, a displacement channel extending therethrough, the displacement channel communicating with the working area and the power area;
    a displaceable table, which comprises a base platform slidably coupled to the two slide rails provided on the base seat of the chassis in the working area;
    a work table, which is adapted to receive and securely hold at least one work piece thereon and is slidably mounted to the displaceable table, the work table being reciprocally movable in a first axial direction;
    a working spindle, which is coupled to the vertical seat of the chassis and is adapted to hold and securely fix at least one tool thereof and is reciprocally movable in a second axial direction;
    a coupling seat, which is structured such that an end of the coupling seat is fixedly connected to or integrally formed with the base platform of the displaceable table, and is slidably coupled to the third slide rail provided on the base seat in the power area and extends through the displacement channel for reciprocal movement in and between the power area and a portion of the working area;
    a driver device, which comprises a motor and a ball screw, the motor being mounted to the base seat in the power area, the ball screw being coupled to the motor and the coupling seat, the ball screw being covered by the coupling seat, wherein the ball screw converts rotation power supplied from the motor into linear movement power to drive the coupling seat and the displaceable table to synchronously conduct reciprocal movement in a third axial direction, the ball screw being located outside the working area;
    wherein the displaceable table comprises the base platform and further comprises a drive source, the base platform being slidably coupled to the two slide rails provided on the base seat of the chassis, the drive source being mounted on the base platform, the work table being slidably mounted on the base platform of the displaceable table and coupled to the drive source so that the drive source drives the work table to conduct reciprocal movement in the first axial direction.

2. The C-type CNC machine center according to claim 1, wherein the working spindle is connected to the vertical seat of the chassis in a manner of being arranged vertically.

3. The C-type CNC machine center according to claim 1, wherein the ball screw comprises a screw rod and a nut that contains therein rolling balls, the nut being mounted to the coupling seat, the screw rod being coupled to the motor and in threading engagement with the nut.

4. The C-type CNC machine center according to claim 1, wherein the coupling seat comprises an elongate hollow body.

* * * * *